United States Patent
Jin

(10) Patent No.: US 6,385,336 B1
(45) Date of Patent: May 7, 2002

(54) IMAGE PROCESSING METHOD AND SYSTEM FOR GENERATING A PALETTE

(75) Inventor: Youchun Jin, Nepean (CA)

(73) Assignee: Corel Corporation (CA)

( * ) Notice: Subject to any disclaimer, the term of this patent is extended or adjusted under 35 U.S.C. 154(b) by 0 days.

(21) Appl. No.: 09/170,693

(22) Filed: Oct. 13, 1998

(51) Int. Cl.$^7$ ................................................ G06K 9/00
(52) U.S. Cl. ......................... 382/162; 382/166; 382/167
(58) Field of Search ................................ 382/162, 166, 382/167, 225, 218, 220; 358/518; 348/577, 663, 807; 345/341

(56) References Cited

U.S. PATENT DOCUMENTS

| | | | |
|---|---|---|---|
| 4,907,075 A | 3/1990 | Braudaway | 358/75 |
| 5,294,918 A | 3/1994 | Preston et al. | 345/155 |
| 5,608,851 A | 3/1997 | Kobayashi | 395/131 |
| 5,664,080 A | 9/1997 | Lucas et al. | 345/431 |
| 5,673,065 A | 9/1997 | DeLeeuw | 345/153 |
| 5,734,368 A | 3/1998 | Meyers et al. | 345/155 |

FOREIGN PATENT DOCUMENTS

| | | | |
|---|---|---|---|
| CA | 2138835 | 7/1995 | G09G/5/04 |
| CA | 2210502 | 3/1998 | G06F/3/12 |

OTHER PUBLICATIONS

CorelDRAW 8, User Manual, Working with bitmaps, Chapter 12, pp. 605–611.
CorelPHOTO–PAINT 8, Converting Images, Chapter 10, pp. 388–396, Chapter 13, Publishing images to the Internet, pp. 489–497.
HVS Color GIF 2.0 Advertising material from Internet.
"Artistic Compression", PC Magazine Online, Nov. 18, 1997.
"HVS Color Online Manual" (Not dated).

Primary Examiner—Phuoc Tran
(74) Attorney, Agent, or Firm—Hayes Soloway P.C.

(57) ABSTRACT

An image processing system and method for generating a palette for paletted images. The invention assigns an area of the color space with a higher importance using weights and color space distance so that more entries in the palette will represent these more important colors. Therefore, the color representation of the paletted image will more closely resemble the original absolute color image in the area of interest.

25 Claims, 10 Drawing Sheets

IMAGE PROCESSING METHOD AND SYSTEM FOR GENERATING A PALETTE

FIELD OF THE INVENTION

The present invention relates to an image processing method and system, and more specifically an image processing method and system for generating a palette.

BACKGROUND

One important issue related to publishing images to the Internet is the size of the image file. Internet or World Wide Web images must both load quickly and look good. Looking good often depends on the number of colours, hence the better looking the image, the larger the number of colours. The disadvantage to a large number of colours is a larger size of the image file. A large image file will slow the loading time for the image and hence the Web page will load slower. A slow loading time is not desirable since many people viewing the Web page will not tolerate the wait and leave the Web page before the page is finished loading. For this reason, producing Web-page images is a compromise between file size and image quality. It is therefore desirable for an image posted to the Internet to look as good as possible, but it's file size must be small enough so that the person viewing the image will wait for it to load.

One known method to reduce the image files to a manageable size for Internet publishing is to compress the file. Unfortunately, the data compression process usually results in some loss of quality. The trick is to lose as little colour quality as possible while reducing the file size. One such way to reduce the size of image files is to reduce the number of colours in them.

Absolute colours images, that is images with a large number of colours, such as up to 16 million colours for example, store up to three 8-bit values for each pixel to determine the colour. Therefore, one way to reduce the image file size would be to store less than these three values. Representing colour in this way is known as a paletted image. A paletted image is uses a relatively small number of colours, often less than 256 and even as low as 8 or 4 colours. If 256 colours or less are used then a single value of 8 bits or less can be used to represent the colours in the image. Therefore, the image file will be smaller in size as compared to that of the absolute colour image. The size of a typical paletted image file is m*n+2k bytes, where the image is m pixels wide by n pixels high and 2 kbytes are used to store the colours. A typical absolute colour image file storing three 8-bit values for each colour is m*n*3 bytes, because each of the m*n pixels has three 8-bit colour values.

Paletted image files store the set of possible colours in a table. The colour of each pixel is represented by one of the entries in this table. The table is called a palette. There are standard palettes available that have a predetermined set of colours.

If an image is converted from a large number of colours, such as 16 million colours, to a small number of colours, such as a less than 256 colour paletted image, there will be some loss of image quality. However, if care is taken when selecting the colours in the palette, acceptable results can be obtained. Therefore, the quality of the colour representation in a paletted image depends on the quality of its associated palette.

Systems and methods to generate palettes in order to reduce the number of colours in a image are well known in the art. Often, these methods consider all the image colours as having the same importance. Therefore, the palette entries are more likely to represent the colours that occur most often in the image.

If the colours of the area of interest in the image do not correspond to the colours that occur most often in the image, then there will be a low number of entries in the palette representing the colours of interest. Hence, the area of interest will not have an acceptable colour representation.

Therefore, when reducing the size of an image by reducing the number of colours, the problem is maintaining an acceptable colour representation in an area of interest that is most similar to the area of interest in the original image. Also, it is desirable to let the user decide what is an acceptable similarity to the original image.

For the foregoing reasons, there is a need to provide a palette for use to achieve an acceptable colour representation in a paletted image.

SUMMARY

The present invention is directed to an image processing system and method for generating a palette to provide a palette for use to achieve an acceptable colour representation in a paletted image for an area of the image regardless of how often the colours in the area of interest occur relative to the rest of the image.

An embodiment of the invention is an image processing method comprising the steps of: determining a most important colour; for each pixel in an image, each of the pixels having a pixel colour, determining a pixel colour weight using the most important colour and the pixel colour; and generating the palette using the pixel colours and the pixel colour weights.

Another embodiment of the invention is an image processing method comprises the steps of: determining a most important colour; for each pixel in an image, each of the pixels having a pixel colour, determining a colour difference by comparing the pixel colour with the most important colour to and then determining a pixel colour weight for each pixel colour using each colour difference; and generating the palette using the pixel colours and the pixel colour weights.

Another embodiment of the invention is an image processing system for generating a palette, the image processing system comprising: means for determining a most important colour; for each pixel in an image, each of the pixels having a pixel colour, means for determining a pixel colour weight using the most important colour and the pixel colour; and means for generating the palette using the pixel colours and the pixel colour weights.

Further, another embodiment of the invention is an image processing product embodied on a computer-readable storage medium for generating a palette, the image processing product comprising: means recorded on the medium for determining a most important colour; for each pixel in an image, each of the pixels having a pixel colour, means recorded on the medium for determining a pixel colour weight using the most important colour and the pixel colour; and means recorded on the medium for generating the palette using the pixel colours and the pixel colour weights.

Moreover, another embodiment of the invention is an image processing product embodied in a carrier wave for generating a palette, the image processing product comprising: means embodied in the carrier wave for determining a most important colour; for each pixel in an image, each of the pixels having a pixel colour, embodied in the carrier wave for determining a pixel colour weight using the most important colour and the pixel colour; and means embodied in the carrier wave for generating the palette using the pixel colours and the pixel colour weights.

An advantage of the invention is that the palette that is generated produces a corresponding paletted image that contains the area of interest that is more similar to the original image in terms of colour.

BRIEF DESCRIPTION OF THE DRAWINGS

These and other features, aspects, and advantages of the present invention will become more apparent from the following description, appended claims, and accompanying drawings where:

DETAILED DESCRIPTION

By way of introduction some definitions and theory is provided. Digital images can be stored in a computer system in a variety of formats. One popular format is known as a bitmap image. A bitmap image is a digital picture composed of discrete elements or dots known as pixels. Each pixel has an associated colour. Taken together all the pixels and the associated colours form the digital image which can be stored or manipulated by a computer system. All bitmaps are constructed by assembling a rectangular grid or matrix of varying pixel colour values to produce an image.

The colours associated with each pixel can themselves be represented in a number of different ways. One such representation is absolute colour representation where each colour is represented by several numbers. For example, three numbers may be used, one each for the red component, the green component and the blue component and this type of image is also known as an RGB image. Other colour combinations are possible, like CMYK, which requires four numbers per colour, or grayscale, which requires one number per colour. Another format is L*a*b, where "L" is luminance and "a" and "b" are chromatic components. The "a" component represents colours that range from green to red and the "b" component represents colours from blue to yellow. L*a*b representation is useful to control the lightness of the image separately from the colour.

Regardless of the colour representation used, each component is known as a channel. Often, the values are plotted in what is known as a colour space. The colour space is a basis where each axis is a channel. When the colour values are treated as coordinates and are plotted in the colour space, mathematical analysis can be conveniently preformed with the colours.

The absolute colour format image is displayed by feeding the values into a digital to analog converter that drives the appropriate output gun in a video monitor. If each value is an 8-bit number, then the three values taken together can represent up to 16 million combinations. Each combination is a colour, hence 16 million colours are possible.

Figure 1:
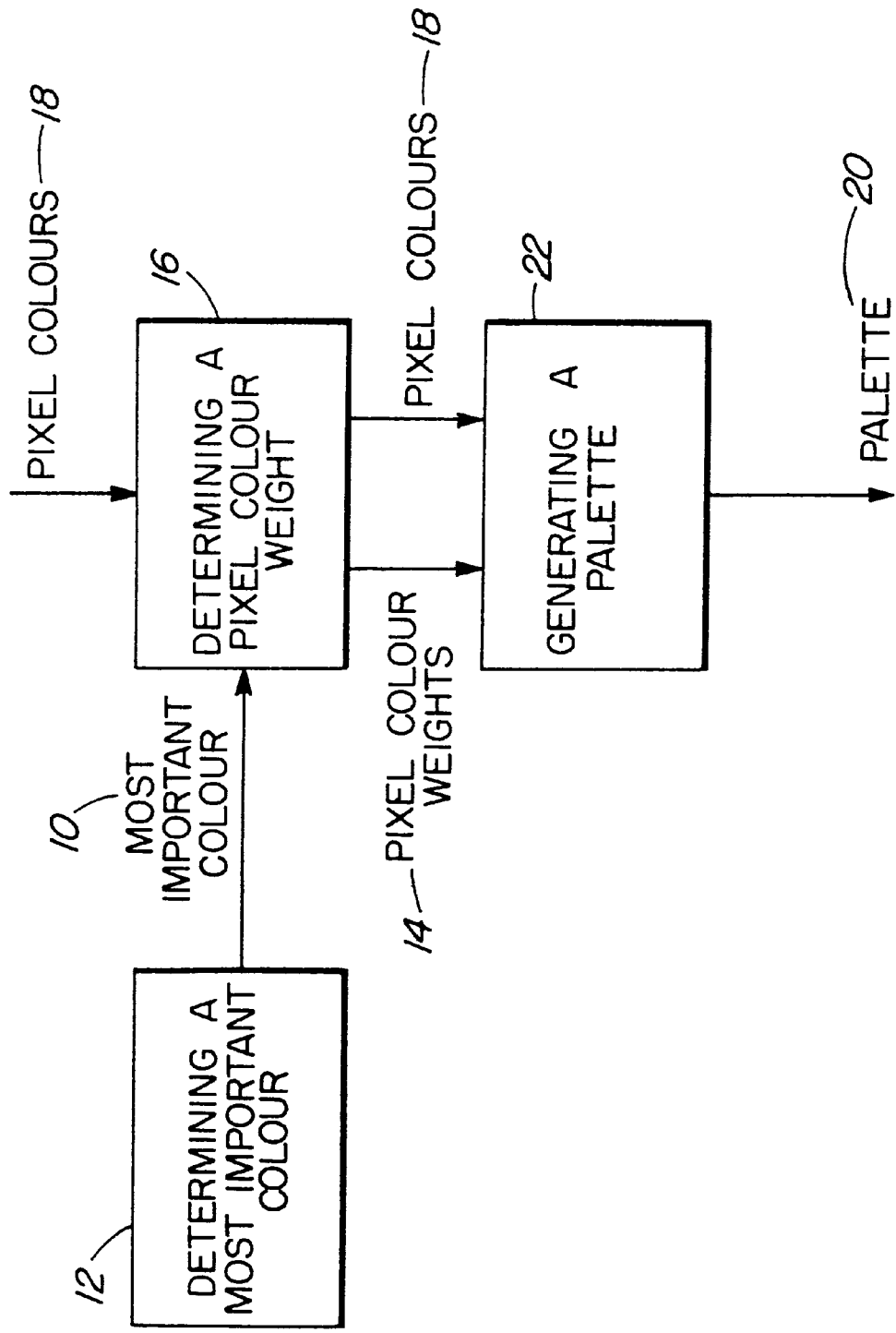
FIG. 1 is a flow chart showing an embodiment of the invention.

By way of overview, an embodiment of the image processing method for generating a palette is shown in FIG. 1. First, a most important colour 10 among the colours in the image is determined in step 12. The image has pixels and each of the pixels has a pixel colour 18, then for each pixel in the image, a pixel colour weight 14 is determined by step 16 using the most important colour 10 and the pixel colour 18. The pixel colour weights 14 and the pixel colours 18 are then used to generate the palette 20 in step 22.

Figure 2:
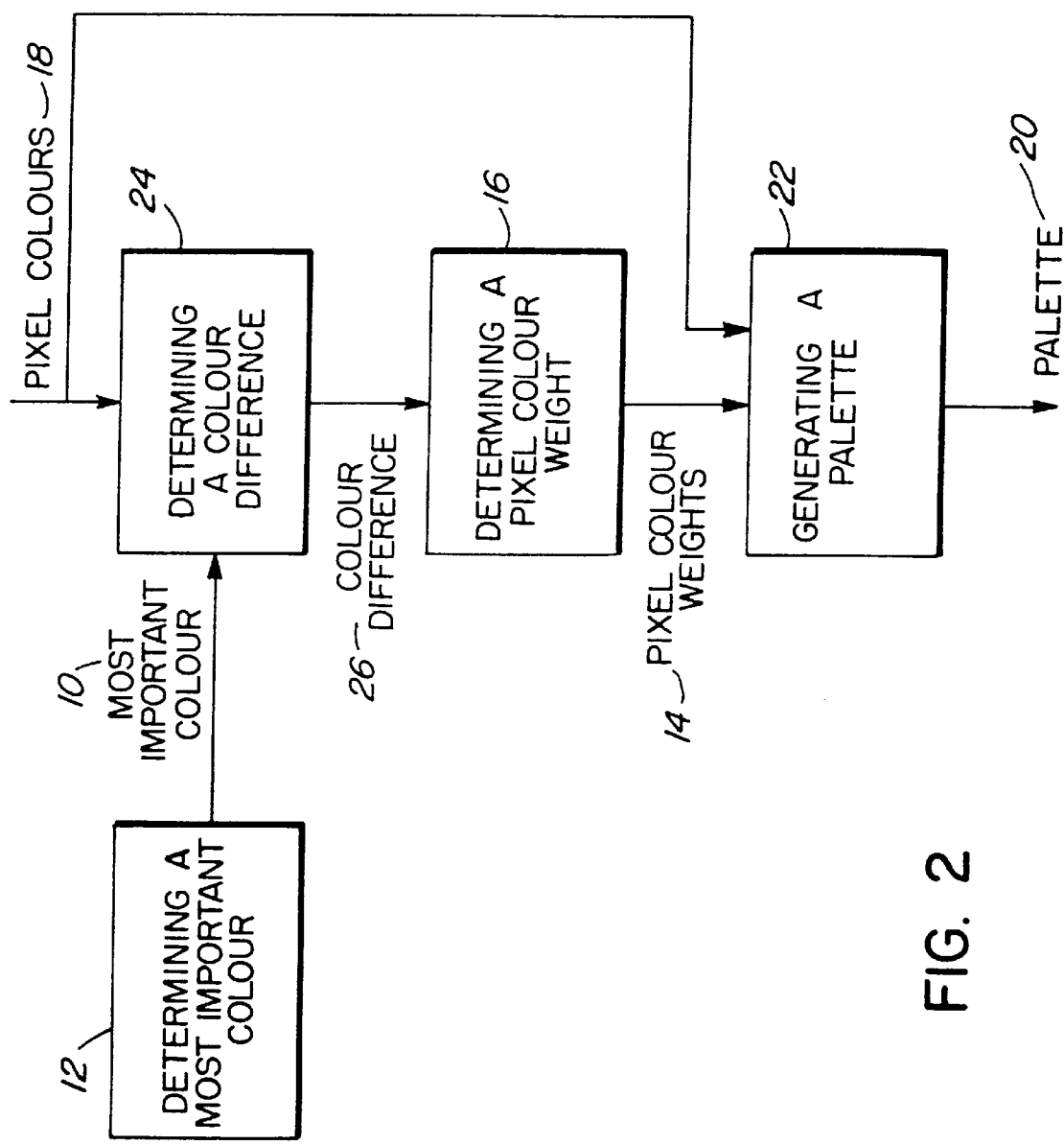
FIG. 2 is a flow chart showing another embodiment of the invention.

Another embodiment of the image processing method is shown in FIG. 2. First, a most important colour 10 is determined in step 12. The image has pixels and each of the pixels has a pixel colour 18, then for each pixel in the image, a colour difference 26 is determined in step 24 by comparing the pixel colour 18 with the most important colour 10, and then a pixel colour weight 14 is determined by step 16 using each colour difference 26 and each pixel colour 18. The pixel colour weights 14 and the pixel colours 18 are then used to generate the palette 20 in step 22.

Furthermore, often the colour difference 26 is determined using the L*a*b colour space as a basis for determining the difference.

The embodiment of the image processing method shown in FIG. 1 is similar to that shown in FIG. 2. In FIG. 2, there is the additional determining step 24. Each of these steps shown in FIGS. 1 and 2 is further described below.

Figure 3:
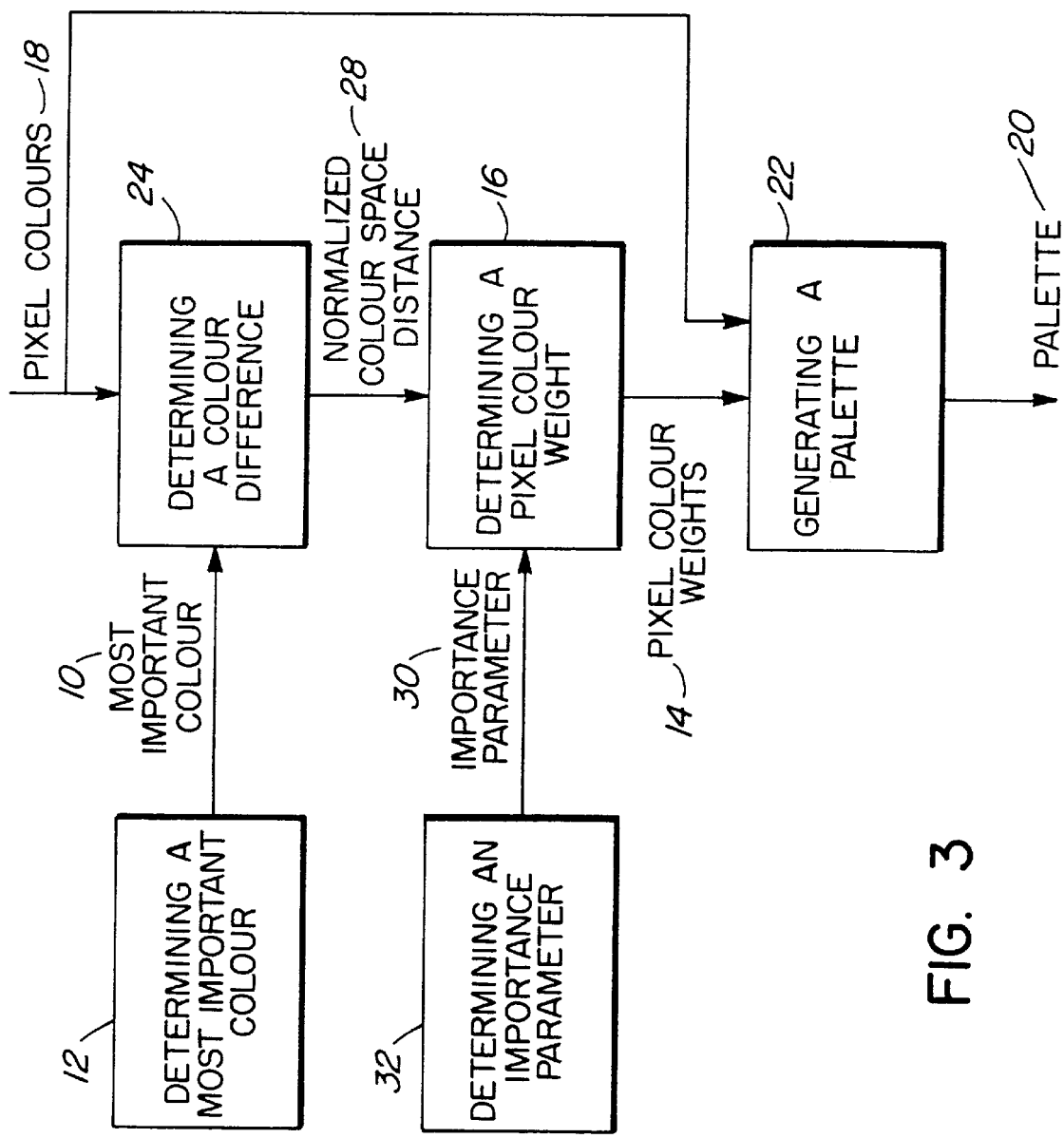
FIG. 3 is a flow chart showing another embodiment of the invention.

Referring to FIG. 3, a further embodiment of the invention is shown which is similar to that shown in FIG. 2. In FIG. 3, in step 24 the colour difference 26 is represented by, a normalized colour space distance 28 between the pixel colour 18 and the most important colour 10. Also in the embodiment shown in FIG. 3, an importance parameter 30 is determined in step 32. Thus, the pixel colour weight 14 is determined in step 16 using the importance parameter 30, the normalized colour space distances 28 and the pixel colours 18.

Figure 4:
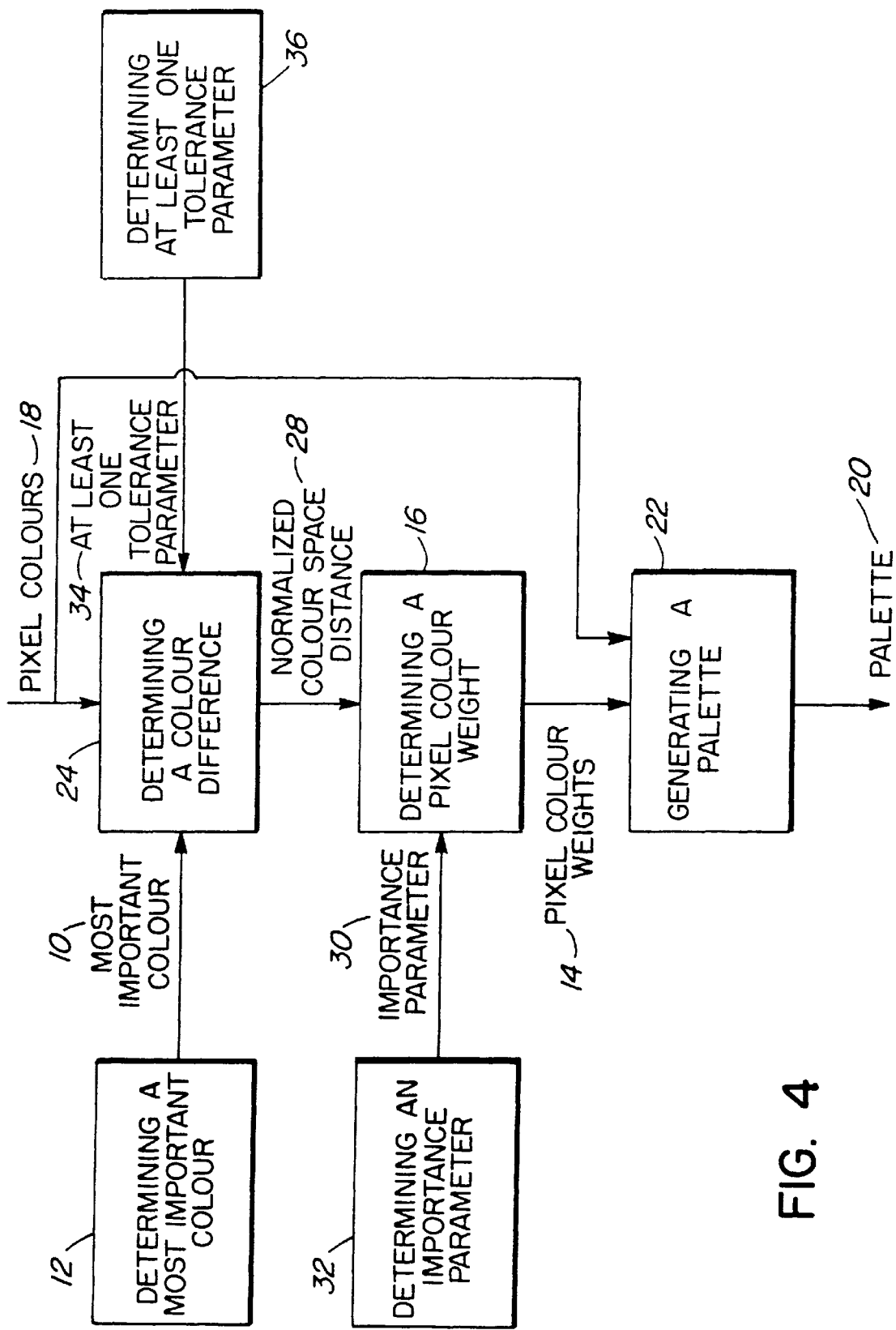
FIG. 4 is a flow chart showing a preferred embodiment of the invention.

Another preferred embodiment of the image processing method is shown in FIG. 4. The embodiment of FIG. 4 is similar to the embodiment of FIG. 3. In FIG. 4, at least one tolerance parameter 34 is determined by step 36, although it is often a preferred embodiment of the invention uses three tolerance parameters 34, one for each channel of the L*a*b colour space. These tolerance parameters 34 are used by step 24 to compare the pixel colour 18 to the most important colour 10 to provide a normalized colour space distance 28. The preferred embodiment of the invention uses the L*a*b colour space to calculate the normalized colour space distance 28. Therefore, in a preferred embodiment of the invention, the normalized colour space distance is given by the following equation:

$$d^2 = \frac{(L - L_{MIC})^2}{T_L} + \frac{(a - a_{MIC})^2}{T_a} + \frac{(b - b_{MIC})^2}{T_b}$$

In above equation d is the normalized colour space distance. $T_L$, $T_a$ and $T_b$ are the tolerance parameters for the three channels of the L*a*b colour space. L, a and b are the coordinates of the pixel colour in the L*a*b colour space. $L_{mic}$, $a_{mic}$ and $b_{mic}$ are the coordinates of the most important colour in the L*a*b colour space.

Figure 5:
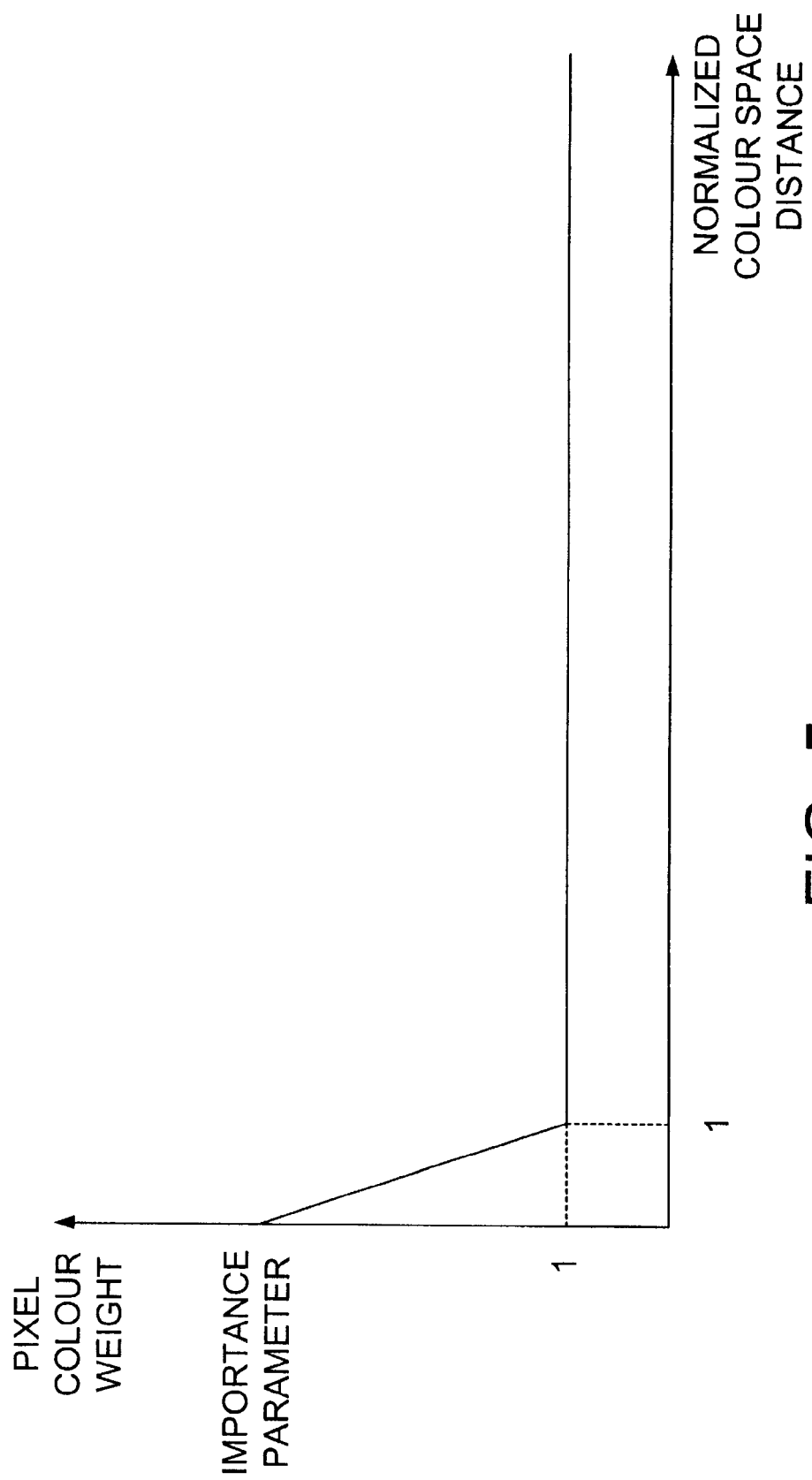
FIG. 5 shows the relationship between pixel colour weight and normalized colour space distance according to the embodiments of the invention shown in FIGS. 3 and 4.

Moreover, the pixel colour weight 14 is determined by step 16 using a relationship shown in FIG. 5. The pixel colour weight is a function of the normalized colour space distance. The pixel colour weight varies from a maximum value substantially equal to the importance parameter to a minimum value substantially equal to unity. The variation from the maximum value to the minimum value is substantially linear. The minimum value occurs when the normalized colour space distance is substantially equal to unity. The pixel colour weight is substantially equal to unity when the normalized colour space difference is equal to, or greater than, unity.

Figure 6:
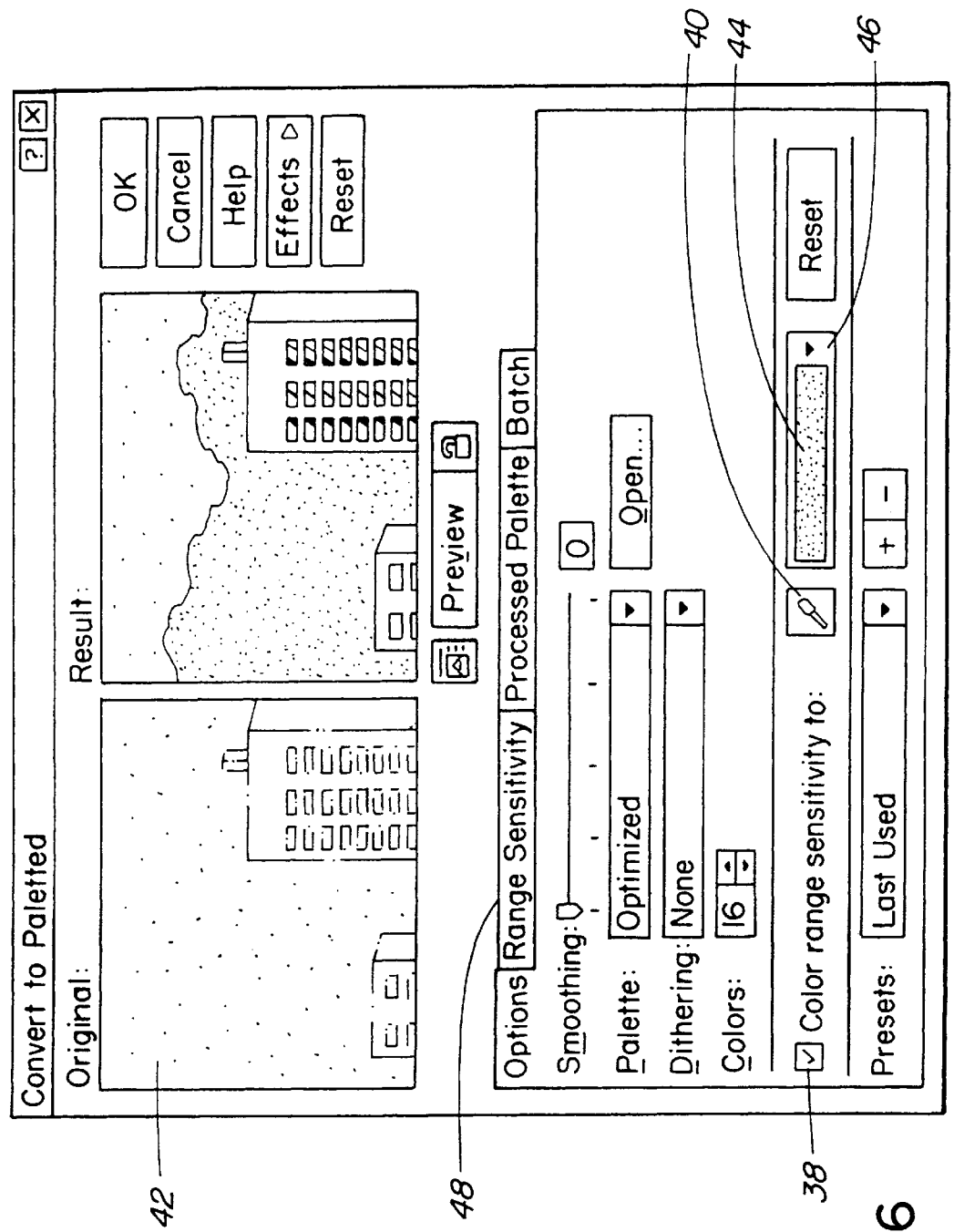
FIG. 6 shows a user interface screen according to an embodiment of the invention.

The preferred embodiment of the invention may be used in an image processing software package such as CorelDraw®, CorelPhotoPaint® and alike. The operation of the method shown in FIG. 4 is described using CorelDraw® as an example. When the user firsts uses the method, a screen is presented as shown in FIG. 6. Various options are available to the user to control the generation of the palette, and ultimately, the conversion to the paletted image. To initiate the method of the present invention the user selects the COLOR RANGE SENSITIVITY TO: 38. Next, the most important colour is determined, either automatically using a predetermined value or by user selection. The user may select the most important colour by using colour selector 40, which in CorelDraw® is known as an eyedropper tool. Once selected, the eyedropper is used to select a colour in the ORIGINAL image window 42, which becomes the most important colour and is shown in the most important colour area 44. Alternatively, the user can use a drop down selector 46 to select the most important colour from colour samples. The user can also select the most important colour using colour space coordinates.

Once the most important colour has been determined, usually user selects the RANGE SENSITIVITY tab 48 to determine the importance parameter and the tolerance parameters. It should be noted, however, that the order of selecting the most important colour, the importance parameter, and the tolerance parameters is not important, accept that in the preferred embodiment of the invention, these parameters are selected before the pixel weights are determined and hence also before the palette is generated.

Figure 7:
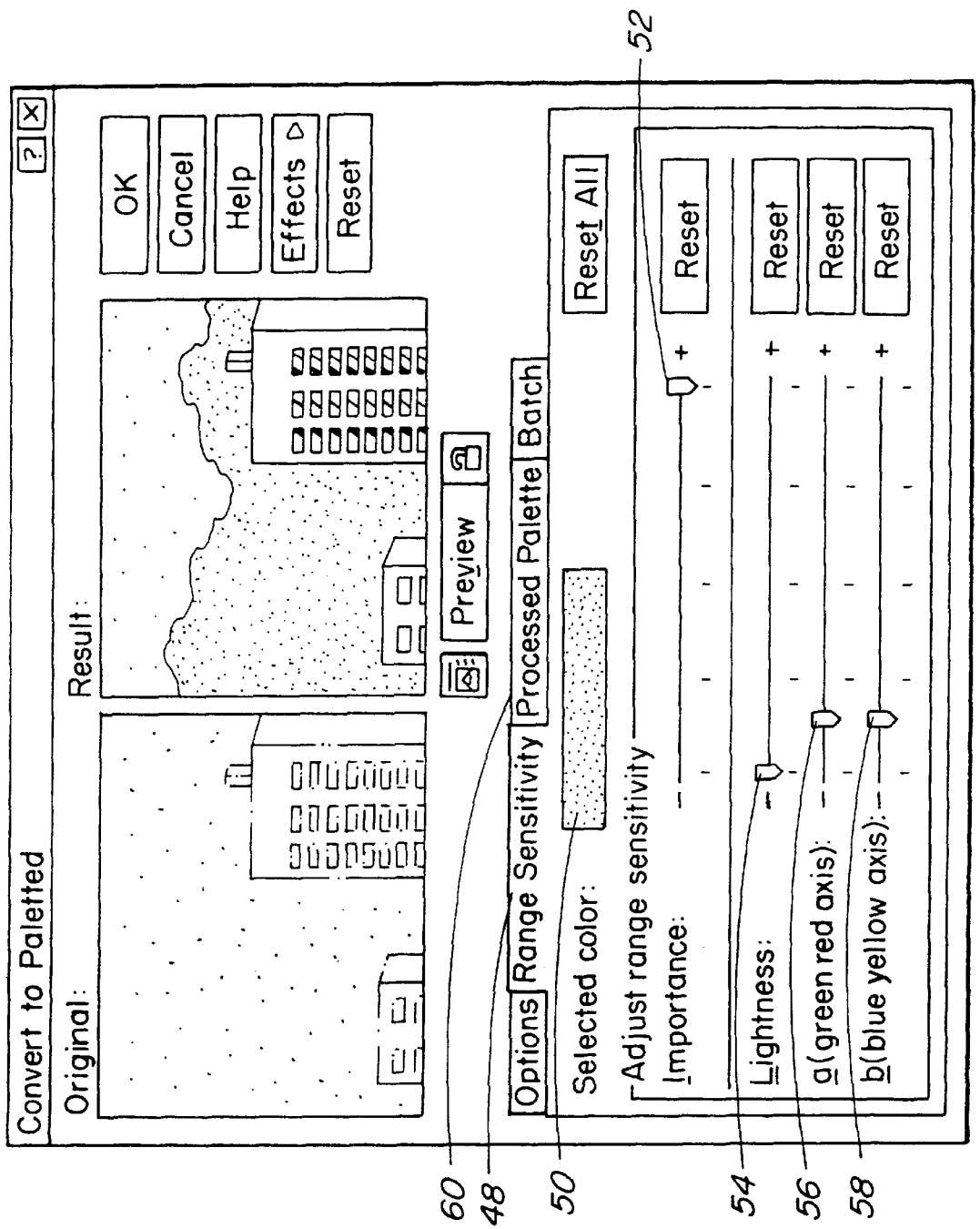
FIG. 7 shows a user interface screen according to an embodiment of the invention.

Once the RANGE SENSITIVITY tab 48 is selected, the user is presented with a screen similar to that shown in FIG. 7. The most important colour is shown in the area 50. The importance parameter and the tolerance parameters are determined either automatically using predetermined values, or the user determines the values using slider controls. The importance slider 52, the L channel tolerance slider 54, the a channel tolerance slider 56 and the b channel tolerance slider 58 are shown in FIG. 7. Usually, the predetermined values are preset in the method. In the case of the most important colour, the automatic selection uses a predetermined value. This value is, however, based on the image from which the palette is being generated. The automatically selected value for the most important colour may be chosen as the entry one-third of the way down a second palette generated from this same image, using a conventional palette generation method, such as adaptive palette conversion, which is known in the art.

Adjusting the sliders alters the shape of the weight distribution shown in FIG. 5. Firstly, if the importance parameter is increased the slope of the linear portion increases. A higher slope causes a higher sensitivity of pixel colour weight to differences in normalized colour space distance. Increasing any one or combination of the tolerance parameters tends to alter where in the colour space the normalized distance is unity. This also impacts the selection of the weight. By altering a tolerance parameter, the user is able to cause the normalized colour space distance to be more or less sensitive to the channel in the colour space that corresponds to the tolerance parameter.

After the importance and the tolerance values have been selected, the user selects the PROCESSED PALETTE tab 60. Once the PROCESSED PALETTE tab 60 is selected, the user is presented with a screen similar to that shown in FIG. 8. The generated palette 20 is shown to the user, each of the colours in the palette 20 is an entry in the palette. The user can either accept this palette or can select the RANGE SENSITIVITY tab 42 or OPTIONS tab 62, to recommence the process as described in the paragraphs above.

Figure 8:
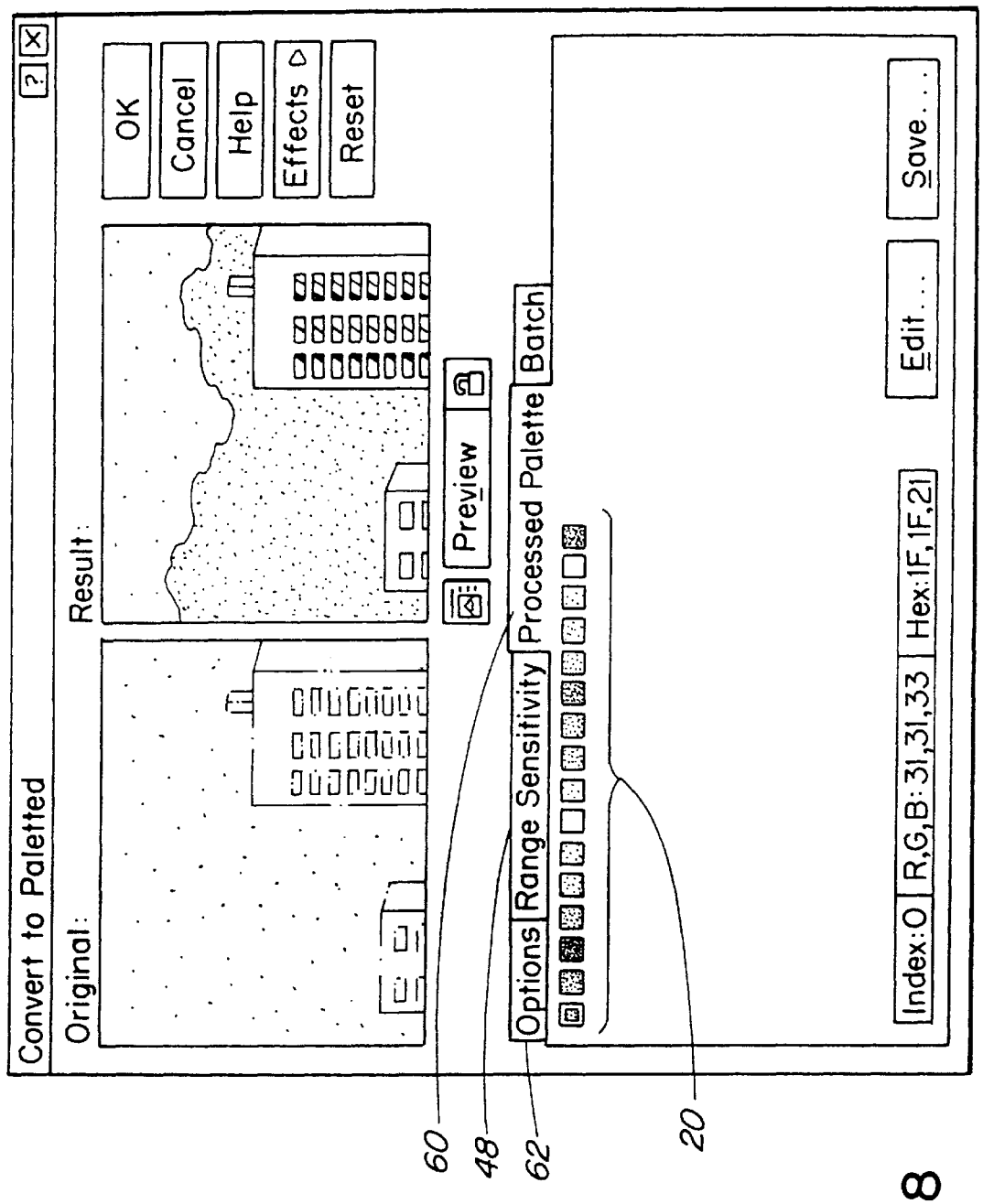
FIG. 8 shows a user interface screen according to an embodiment of the invention.

The screens illustrated in FIGS. 6, 7 and 8 are presented as an example only. Many other variations are possible.

Advantages of the embodiments of the invention are now described. The invention assigns an area of the colour space with a higher importance so that more entries in the palette will represent the important colours. Therefore, the colour representation of the paletted image will more closely resemble the original image in the area of interest, with respect to the original image. Further, an embodiment of the invention includes control to customize the final image. The invention is useful when the interesting area of colour is small compared to the other areas of the picture or the get better colour representation in a close area for the picture, with respect to the original image.

Generally speaking, the invention assigns a weight to each colour in the colour space to distinguish the important area from the other parts of the image. The invention uses a single colour as the most important colour. Each colour in the image is compared to most important colour using in the colour space. The colour difference between the pixel colour and the most important colour is used to determine the weight of that pixel colour. The closer the pixel colour to the most important colour, the higher the weight. The weight of a colour, and the colour itself, is used to generate the entries in the palette. With the higher weights for the colours closer to the most important colour, the entries in the palette will contain colours that give a better colour representation for the important area in the paletted image, with respect to the original image.

A further advantage of the invention is that the palette is generated with input from a user, therefore the user is able determine what is an acceptable colour similarity for the area of interest in the image.

Another advantage of the invention is the use of the L*a*b colour space. In other colour spaces, such as RGB, consider two sets of two colours. A viewer would perceive the colour difference in each set differently. Thus, one would expect that the colour space distance between the colours in each set to be different. However, in colour spaces such as the RGB, it is possible for both sets of colours to have the same colour space distance. Therefore, the colour space distance may not be used reliably to determine a unique colour difference as perceived by a viewer. The L*a*b colour space on the other hand can be used reliably. Each colour difference perceived by a viewer has a unique colour space distance when the L*a*b colour space is used.

Another advantage of embodiment in FIG. 4 is the use of the tolerance values. If the weight distribution is considered in the colour space, the weight corresponds to a series of ellipsoids surrounding the most important colour. At the most important colour the weight distribution ellipsoid is a point and is substantially equal to the importance parameter. The weight corresponding to each ellipsoid decreases linearly the farther away from the most important colour, until the normalized distance from the most important colour is substantial equal to unity. When a pixel colour is considered, its associated weight is determined by the ellipsoid which passes through the pixel colour in the colour space. The tolerance values for each channel adjust the shape of the series of ellipsoids with respect to each channel. Therefore, by adjusting the tolerance values, the weight distribution is customized.

Figure 9:
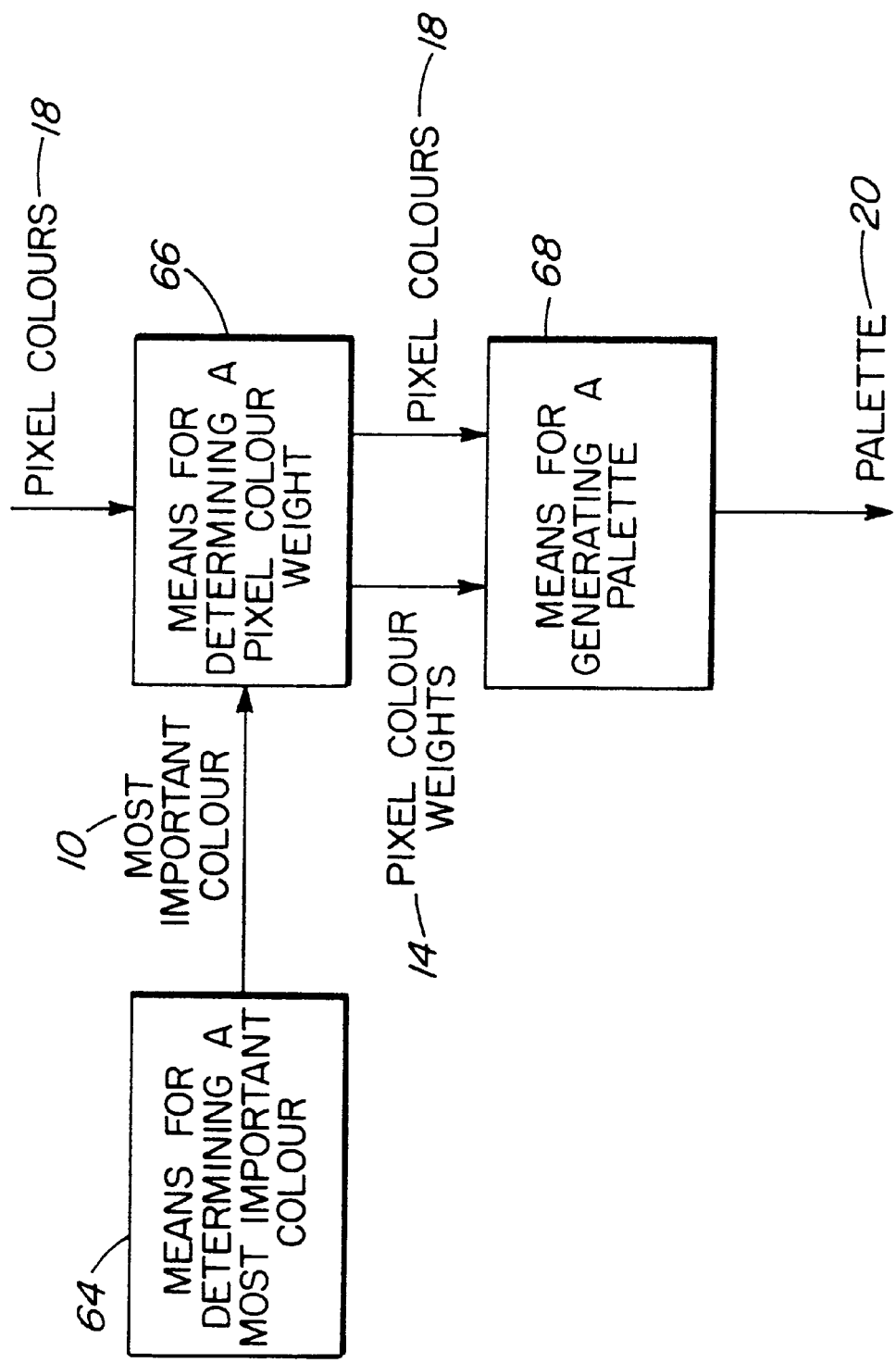
FIG. 9 is a block diagram showing another embodiment of the invention.

Another embodiment of the invention is a image processing system for generating a palette shown in FIG. 9. The image processing system comprises the following elements: means 64 for determining a most important colour 10 in an image, the image having pixels; for each pixel in the image, each of the pixels having a pixel colour 18, means 66 for determining a pixel colour weight 14 using the most important colour 10 and the pixel colour 18; and means 68 for generating the palette 20 using the pixel colours 18 and the pixel colour weights 14.

Figure 10:
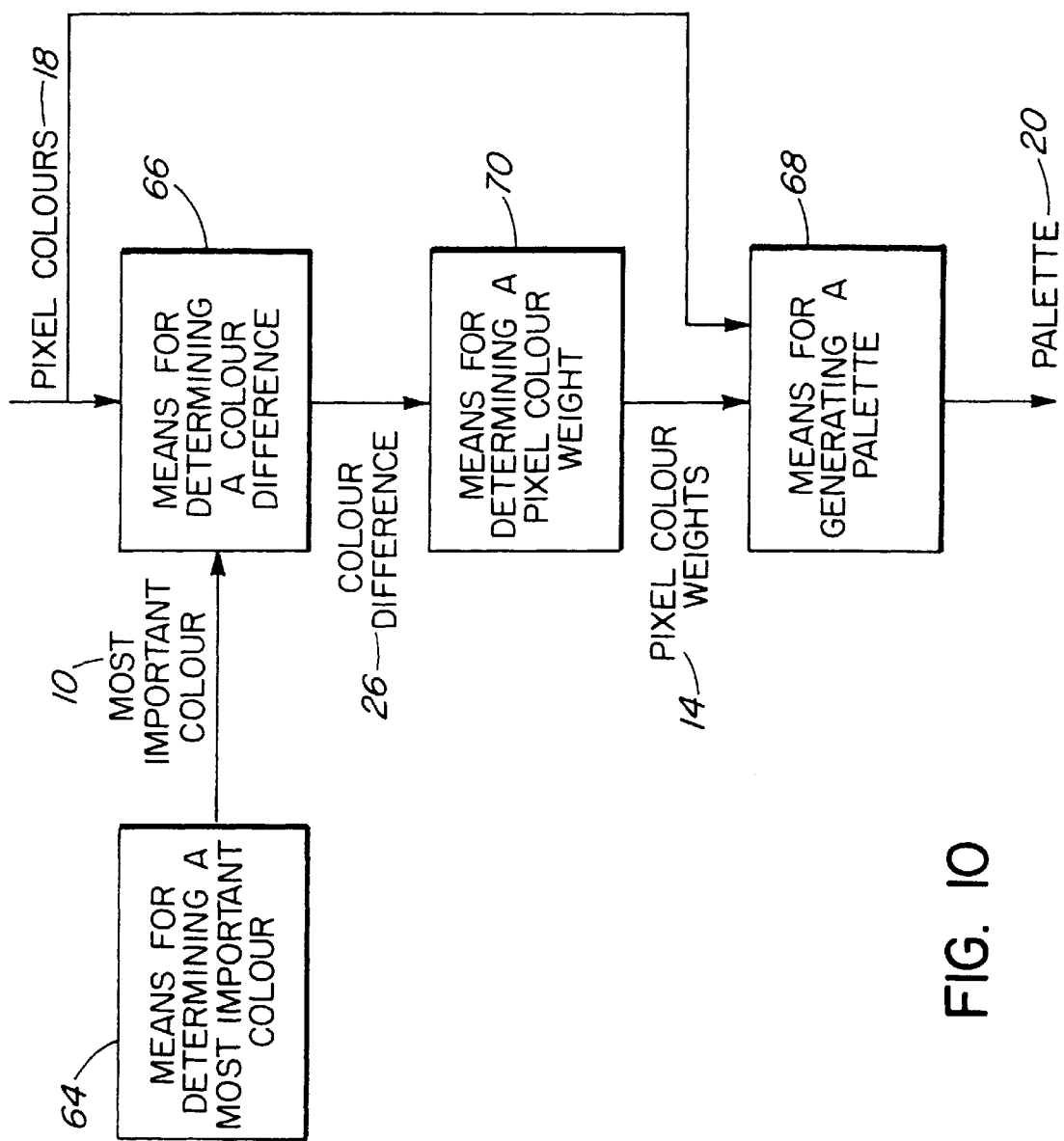
FIG. 10 is a block diagram showing another embodiment of the invention.

A further embodiment of the invention is shown in Figure 10. An image processing system for generating a palette, the image processing system comprising the following elements: means 64 for determining a most important colour 10 in an image, the image having pixels; for each pixel in the image, each of the pixels having a pixel colour 18, means 66 for determining a colour difference 26 by comparing the pixel colour 18 with the most important colour 10 and means 70 for determining a pixel colour weight 14 for each pixel colour 18 using each colour difference 26; and means 68 for generating the palette 20 using the pixel colours 18 and the pixel colour weights 14.

The means to implement the functions in the image processing system would be know to those skilled in the art of image processing. Examples of such means are digital signal processors, microprocessors, application specific integrated circuits, and each of these could be implemented in integrated or discrete form. The operation and advantages of the embodiments of the image processing system are analogous to the operation and the advantages of the corresponding embodiments of the image processing method.

Although the present invention has been described in considerable detail with reference to certain preferred embodiments thereof, other embodiments and modifications are possible. For example, the method described in the description and the drawings can be equally implemented in a system of components, wherein each component carries out the same steps as outlined in the above description and the associated drawings. Furthermore, the entire method described herein, or parts thereof, can be implemented in a computer-readable product or a carrier wave. Therefore, the scope of the appended claims should not be limited to the description of the preferred embodiments contained herein.

What is claimed is:

1. An image processing method for generating a palette, the method comprising the steps of:

determining a most important colour in an image, the image having pixels;

determining an importance parameter;

for each pixel in the image, each of the pixels having a pixel colour:

determining a colour difference by comparing the pixel colour with the most important colour, wherein
the colour difference is represented by a normalized colour space distance between the pixel colour and the most important colour; and determining a pixel colour weight for each pixel colour using the colour difference, wherein
the pixel colour weight determined using the normalized colour space distance and the importance parameter; and generating the palette using the pixel colours and the pixel colour weights.

2. An image processing method as recited in claim 1, further comprising the step of:

determining at least one tolerance parameter; and wherein the normalized colour space distance is a function of the pixel colour, the most important colour and at least one tolerance parameter.

3. An image processing method as recited in claim 1, wherein the normalized colour space distance uses a L*a*b colour space.

4. An image processing method as recited in claim 1, further comprising the step of:

determining at least one tolerance parameter;

wherein the normalized colour space distance is a function of the pixel colour, the most important colour, and at least one tolerance parameter; and wherein the normalized colour space distance uses a L*a*b colour space.

5. An image processing method as recited in claim 1, wherein the pixel colour weight is a function of the normalized colour space distance.

6. An image processing method as recited in claim 5, wherein the pixel colour weight varies from a maximum value equal to the importance parameter to a minimum value equal to unity, wherein the variation of pixel colour weight to normalized colour space distance is linear for a range of normalized colour space distance between 0 and 1: and the minimum value occurs when the normalized colour space distance is equal to unity; and the pixel colour weight is equal to unity when the normalized colour space difference is equal to, or greater than, unity.

7. An image processing method for generating a palette, the method comprising the steps of:

determining a most important colour in an image, the image having pixels; determining an importance parameter;

determining at least one tolerance parameter;

for each pixel in the image, each of the pixels having a pixel colour:

determining a colour difference by comparing the pixel colour with the most important colour, wherein
the colour difference is represented by a normalized colour space distance between the pixel colour and the most important colour, wherein the normalized colour space distance is a function of the pixel colour, the most important colour and at least one tolerance parameter; and the normalized colour space distance uses a L*a*b colour space; and determining a pixel colour weight for each pixel colour using each colour difference, wherein the pixel colour weight is determined using the normalized colour space distance and the importance parameter, wherein the pixel colour weight is a function of the normalized colour space distance;

the pixel colour weight varies from a maximum value equal to the importance parameter to a minimum value equal to unity, wherein the variation of pixel colour weight to normalized colour space distance is linear for a range of normalized colour space distance between 0 and 1; and the minimum value occurs when the normalized colour space distance is equal to unity; and the pixel colour weight is equal to unity when the normalized colour space difference is equal to, or greater than, unity; and generating the palette using the pixel colours and the pixel colour weights.

8. An image processing method as recited in claim 7, the determining the most important colour step further comprising the step of:

selecting the most important colour automatically or by a user input.

9. An image processing method as recited in claim 8, wherein the user input is a colour selector or colour space coordinates or a colour sample.

10. An image processing method as recited in claim 8, wherein the automatic selection is a predetermined entry in a palette generated by an adaptive palette conversion method.

11. An image processing method as recited in claim 7, the determining an importance parameter step further comprising the step of:

selecting the importance parameter automatically or by a user input.

12. An image processing method as recited in claim 11, wherein the user input is a slider.

13. An image processing method as recited in claim 11, wherein the automatic selection is a predetermined value.

14. An image processing method as recited in claim 7, the determining at least one tolerance parameter step further comprising the step of:

selecting each tolerance parameter automatically or by a user input.

15. An image processing method as recited in claim 14, wherein each tolerance parameter corresponds to a colour space channel.

16. An image processing method as recited in claim 14, wherein the user input is a slider.

17. An image processing method as recited in claim 14, wherein the automatic selection is a predetermined value.

18. An image processing system for generating a palette, the image processing system comprising:

means for determining a most important colour in an image, the image having pixels;

means for determining an importance parameter;

for each pixel in the image, each of the pixels having a pixel colour:

means for determining a colour difference by comparing the pixel colour with the most important colour, wherein the color difference is represented by a normalized colour space distance between the pixel colour and the most important colour; and means for determining a pixel colour weight for each pixel colour using the colour difference, wherein the pixel colour weight determined using the normalized colour space distance and the importance parameter; and means for generating the palette using the pixel colours and the pixel colour weights.

19. An image processing system as recited in claim 18, further comprising:

means for determining at least one tolerance parameter; and wherein the normalized colour space distance is a function of the pixel colour, the most important colour and at least one tolerance parameter.

20. An image processing system as recited in claim 18, wherein the normalized colour space distance uses a L*a*b colour space.

21. An image processing system as recited in claim 18, further comprising:

means for determining at least one tolerance parameter;

wherein the normalized colour space distance is a function of the pixel colour, the most important colour and at least one tolerance parameter; and wherein the normalize colour space distance uses a L*a*b space.

22. An image processing system as recited in claim 18, wherein the pixel colour weight is a function of the normalized colour space distance.

23. A image processing system recited in claim 22, wherein the pixel colour weight varies from a maximum value equal to the importance parameter to a minimum value equal to unity, wherein the variation of pixel colour weight to normalized colour space distance is linear for a range of normalized colour space distance between 0 and 1; and the minimum value occurs when the normalized colour space distance is equal to unity;

the pixel colour weight is equal to unity when the normalized colour space difference is equal to, or greater, unity.

24. An image processing product embodied on a computer-readable storage medium for generating a palette, the image processing product comprising:

a module for determining an importance parameter;

for each pixel in the image, each of the pixels having a pixel colour:

a module for determining a colour difference by comparing the pixel colour with the most important colour, wherein tie colour difference is represented by a normalized colour space distance between the pixel colour and the most important colour; and a module for determining a pixel colour weight for each pixel colour using the colour difference, wherein the pixel colour weight determined using the normalized colour space distance and the importance parameter; and a module for generating the palette using the pixel colours and the pixel colour weights.

25. An image processing product embodied in a carrier wave for generating a palette, the image processing product comprising:

means embodied in the carrier wave for determining an importance parameter;

for each pixel in the image, each of the pixels having a pixel colour:

means embodied in the carrier wave for determining a colour difference by comparing the pixel colour with most important colour, wherein the colour difference is represented by a normalized colour space distance between the pixel colour and the most important colour; and means embodied in the carrier wave for determining a pixel colour weight for each pixel colour using the colour difference, wherein the pixel colour weight determined using the normalized colour space distance and the importance parameter; and means embodied in the carrier wave for generating the palette using the pixel colours and the pixel colour weights.

* * * * *

UNITED STATES PATENT AND TRADEMARK OFFICE
CERTIFICATE OF CORRECTION

PATENT NO. : 6,385,336 B1
DATED : May 7, 2002
INVENTOR(S) : Youchun

It is certified that error appears in the above-identified patent and that said Letters Patent is hereby corrected as shown below:

Column 10,
Line 50, after "greater" insert -- than --
Line 60, "tie" should be -- the --

Signed and Sealed this

Third Day of December, 2002

JAMES E. ROGAN
*Director of the United States Patent and Trademark Office*